June 13, 1961 J. W. HORNER 2,988,430
FUEL DISSOCIATION CHAMBER

Filed Feb. 11, 1958 3 Sheets-Sheet 1

Inventor
John W. Horner

June 13, 1961   J. W. HORNER   2,988,430
FUEL DISSOCIATION CHAMBER
Filed Feb. 11, 1958   3 Sheets-Sheet 3
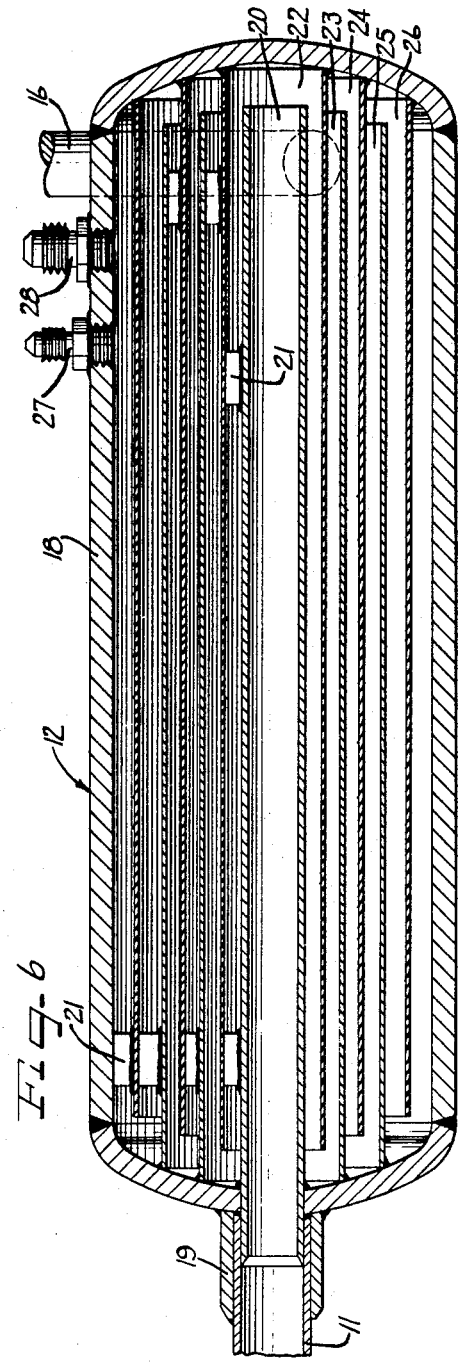
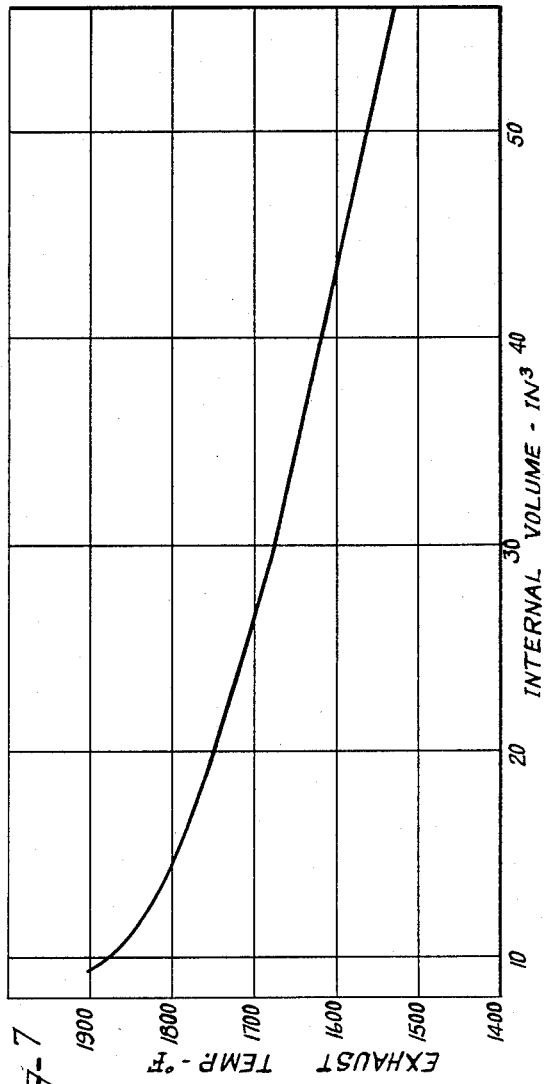
Inventor
John W. Horner United States Patent Office
2,988,430
Patented June 13, 1961

2,988,430
FUEL DISSOCIATION CHAMBER
John W. Horner, Whittier, Calif., assignor to Thompson Ramo Wooldridge, Inc., a corporation of Ohio
Filed Feb. 11, 1958, Ser. No. 714,553
7 Claims. (Cl. 23—281)

The present invention relates broadly to the decomposition of high energy fuels, and is more particularly concerned with a new and improved method and means for thermally dissociating hydrazine and like compositions.

It has heretofore been customary in the art to promote the decomposition of hydrazine and the ammonia dissociation product therefrom by gas generating apparatus containing therewithin a suitable catalytic material with which the fuel was caused to make contact. This arrangement, however, is characterized by a number of disadvantages and objections. First, the pellet catalyzers employed for this purpose have variable packing densities, and frequently non-uniform results in the percentage of ammonia decomposed are obtained. Accordingly, the desired degree of temperature reduction of the exhaust gases is not accomplished, and a likelihood of damage to engine components arises. Second, the catalytic bed employed is subject to vibration and to pressure differentials along its length, both of which conditions are conducive to catalyzer break-down, and consequent substantial losses in the bed efficiency and a gradual attrition thereof. Should the bed be impaired to a sufficient degree, experience has shown that frequently the catalytic material will enter the gas flow to the exhaust port and thereafter pass into the turbine, with obvious deleterious results.

These and other known objections to prior art gas generators are essentially entirely avoided by the dissociation chamber construction and decomposition method of this invention. The novel structure herein fully disclosed is characterized in part by the complete absence therefrom of catalytic materials, and comprises in general a primary reaction zone or chamber heated by a glowing member or igniter located in impinging contact with an atomized liquid mixture of hydrazine and like fuels, and decomposed thereby into gaseous products which are further dissociated in a secondary reaction zone or chamber by heat transfer techniques and thereafter exhausted through a suitable outlet at the desired temperature. The exothermic energy produced by the initial decomposition is transferred by conductance to the secondary reaction zone wherein heat exchange means are located to maintain the temperature of the gaseous products at the desired level to promote their dissociation and the absorption of heat energies by endothermic reaction.

An important aim of the present invention is to provide an effective thermal decomposition method and means for hydrazine and like fuels which is productive of predictable results in the degree of dissociation effected.

Another object of the invention lies in the provision of gas generating apparatus which is not subject to noticeable break-down under conditions of vibration and pressure differentials thereacross.

Another object of this invention is to provide a reaction chamber structure for high energy fuels which is of relatively simple construction and extreme reliability, having in addition weight and space requirements substantially less than heretofore employed arrangements.

Still another object of the invention is to provide a novel method of non-catalytically decomposing hydrazine and like compounds, characterized in part by injecting the compound into a first reaction zone heated to at least the decomposition temperature of the compound to promote the initial dissociation thereof and the release of substantial exothermic energies, directing the gaseous products along a heat exchange path through a second reaction zone to induce decomposition of the gaseous products and the absorption of endothermic energies, and exhausting the gaseous products at a reduced temperature non-injurious to component structure.

A further object of the present invention is to provide a new and improved dissociation chamber having a fluid inlet and fluid outlet and heat exchange means located therein, the fluid being received in gaseous form through the inlet and directed through the heat exchanger and along a path of controlled length and area heated by exothermic energies, the gaseous products being decomposed along the heat exchange path to effect thermal decomposition and temperature reduction thereof by endothermic reaction.

A further object of this invention lies in the provision of a hydrazine dissociation chamber wherein the ammonia product of hydrazine decomposition is passed in heat exchange relation through the interior of the chamber and a temperature reduction of the ammonia product accomplished in accordance with the product of the gas flow path and scrubbed area provided within the dissociation chamber.

Other objects and advantages of the invention will become more apparent during the course of the following description, particularly when taken in connection with the accompanying drawings.

In the drawings, wherein like numerals are employed to designate like parts throughout the same:

FIGURE 6 is a vertical cross-sectional view of the exemplary form of gas generator of FIGURE 4; and FIGURE 7 is a graph plotting internal volume against exhaust temperatures.

It is known that hydrazine decomposes into ammonia, nitrogen and hydrogen upon reaching a critical temperature and pressure, and releases sufficient thermal energy to heat the gaseous products of decomposition to a temperature greater than approximately 2000° F. The gaseous ammonia product is not stable at this elevated temperature, and rapidly dissociates into nitrogen and hydrogen, absorbing sufficient thermal energy to reduce the temperature of the exhaust gases to about 1900° F. At this point approximately 30% of the ammonia is dissociated.

It is desired in many instances, however, that even further temperature reductions be accomplished in order to prolong the life of the turbine materials. Particularly is this important when it is borne in mind that many existing materials were not originally designed to sustain over long periods the high temperatures currently encountered with high energy fuels.

Figure 3:
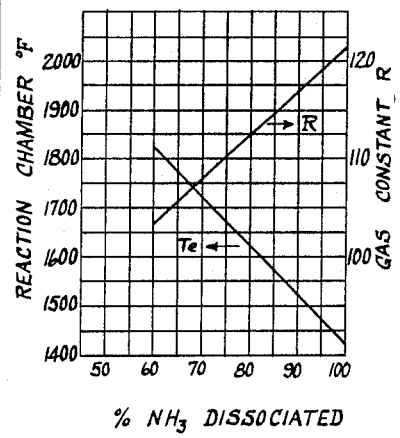
FIGURE 3 is a graph plotting reaction chamber temperature and product gas constant against percentage of ammonia dissociated.

Reaction chamber temperatures as a function of percentage ammonia dissociation are shown graphically in FIGURE 3. Plotted thereon are the results obtainable by decomposing essentially pure hydrazine; however, it may be anticipated that a substantially similar curve will be displayed by mixtures of hydrazine origin showing related phenomena. It may be seen on the graph that the promotion of about 60% ammonia dissociation produces an exhaust gas temperature of approximately 1825° F. Further, exhaust gas temperature reductions in increments of about 100° are obtained with each 10% increase in ammonia dissociation from 60% to 100%. In addition, gas constant R increases from 103 to 121 as the percentage of ammonia dissociated increases from around 60% to 100%.

As previously stated, it has heretofore been customary to decompose hydrazine and promote the dissociation of the ammonia product thereof by use of a gas generator provided interiorly with a catalyst bed of suitable composition. Assuming a given flow rate and supply pressure, the parameters which governed the temperatures of the exhaust gases emitted was the particular catalytic agent employed and the length of the catalyst bed for a given diameter. However, considerable experience with a generator of this type has demonstrated that the catalytic bed is subject to the effects of vibration and substantial pressure differentials along the length thereof, both conditions being productive in many instances of the breakup of the catalyst bed and a consequent gradual attrition and efficiency loss thereof. Further, since the pellet catalyzers employed have variable packing densities, it has often been difficult to predict the results which would be obtained therefrom.

Figure 1:
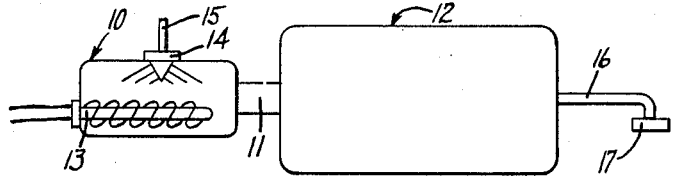
FIGURE 1 is a schematic view of a typical gas generator embodying the principles of this invention.

Referring now to FIGURE 1, there is shown a thermal decomposition gas generator by means of which the objections long associated with the catalytic-type reaction chamber may effectively be avoided. The gas generator schematically shown comprises a first reaction chamber or zone 10 connected by suitable ducting 11 to a secondary reaction zone or dissociation chamber 12. Supported interiorly of the first reaction chamber 10 are suitable heating means 13 against which the fuel composition is injected from an inlet nozzle 14 and supply pipe 15, the products of the decomposition reaction within the heated chamber 10 and exothermic energies therefrom then being directed through the ducting or connection 11 to the dissociation chamber 12 wherein said gaseous products flow along a heat exchange path of predetermined construction to effect their further dissociation. The dissociated gaseous products are then passed outwardly from the chamber 12 through an outlet connection 16 and exhaust nozzle 17. Suitable instrumentation devices, such as thermocouples, pressure gauges and like means are of course employed with the gas generator construction shown to obtain information with respect to the performance thereof.

The reaction chambers 10 and 12 are pressurized during the dissociation of the fluids directed therein, and should be of a construction capable of withstanding pressures in the order of 600 p.s.i. An essential characteristic of the pressure vessels 10 and 12 is effective conductivity of the thermal energy resulting from he combustion of hydrazine, which may be in the order of 148.6 rcal./mol., and accordingly, the vessels are preferably of an essentially metal construction.

Heating means 13 in the form of coils are shown in the reaction chamber 10 for purposes of illustration; however, the heater or igniter may be of a different character. Electrical resistant type wire or ribbon heater elements, either of an open construction or encased within an electrically insulated metal housing, may be employed with good results. It is desired that the heating means 13 within the housing or chamber 10 be heated to a temperature of the order of 700° F. or higher, in order to properly initiate the exothermic reaction, and many heating means of conventional construction will be found effective for this purpose. Further, it may be desired upon occasion to apply heat externally to the walls of the pressure vessel 10 in order to induce a more rapid reaction of the fuel mixture.

The fuel injector nozzle 14 may take a number of different forms known to the art, and should be capable of delivering into the chamber 10 quantities of liquid fuel at a rate of not less than about 500 pounds per hour at pressures of approximately 600 pounds per square inch.

Figure 5:
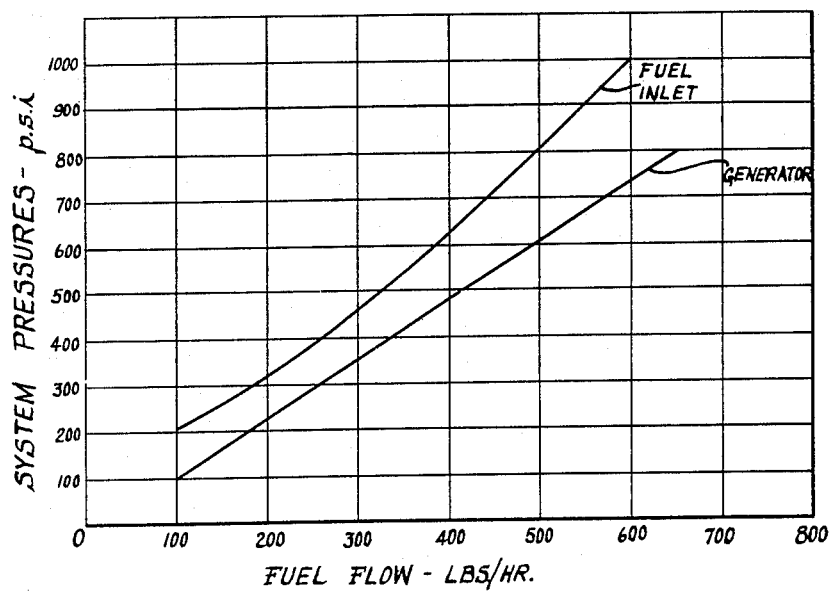
FIGURE 5 is a graph plotting fuel flow against system pressure at both the fuel inlet and within the gas generator.

However, under actual operating conditions, the chamber 10 and chamber 12 may be utilized effectively at flow rates and pressures varying somewhat from the values indicated. The rate of fuel flow naturally has an effect upon the pressures of the system disclosed in FIGURE 1, and this is shown graphically in FIGURE 5. System pressures in pounds per square inch are plotted against fuel flow in pounds per hour, the upper line on the graph reflecting readings obtained adjacent the fuel inlet 14, while the lower line indicates pressures within the secondary reaction chamber 12. It may be seen from FIGURE 5 that pressures within the dissociation chamber 12 were generally below those present at the fuel inlet 14, and that an increase in the fuel flow rate was productive of an increase in the system pressures.

The fuel composition is atomized by the nozzle 14 into the heated chamber interior and into impinging contact with the igniter member 13, and it is desired that the maximum quantity of fuel spray make contact with the surface of the igniter. Further, the igniter member should have adequate heat storage to overcome the quenching action of the injected fuel. For this purpose, the nozzle 14 in the structure of FIGURE 1 is arranged in the reaction chamber top wall, however, other positions of the nozzle have proven well in practice, and may be found preferable in certain instances. Further, increased impingement of the fuel on the igniter member may be obtained by the use of additional injector nozzles arranged around the periphery of the reaction chamber 10.

The fuel mixture introduced into the chamber 10 is received through the inlet 15 from a supply source which may be fuel tanks pressurized by nitrogen bottles. The mixture may comprise hydrazine as the sole constituent, or in combination with water and either ammonium nitrate or nitric acid in substantially the percentages earlier indicated. While the gas generator construction and decomposition method of this invention are presently of prime interest in connection with the dissociation of hydrazine fuels, success may also be obtained with the same arrangement in the decomposition of other fuels which have dissociation properties similar to hydrazine. It will, accordingly, be appreciated that the gas generator construction herein disclosed is of important application with high energy fuels other than the compounds specifically mentioned.

The exhaust nozzle 17 may be provided in a number of different forms, and particularly good results have been achieved to date with hot nozzles having areas varying from about 0.01 to 0.04 square inch. Temperature indicating means are of course positioned in close proximity to the nozzle to obtain exhaust gas readings.

As earlier stated, hydrazine fuel mixtures introduced through the inlet 14 into the reaction chamber 10 are rapidly decomposed into amonia, nitrogen and hydrogen. Substantial exothermic energy is released during the decomposition of hydrazine, and since the ammonia product is not stable at temperatures existing during the exothermic reaction, the ammonia gas is promptly decomposed into nitrogen and hydrogen and absorbs thermal energy to reduce the temperature of the exhaust gases to approximately 1900°. This temperature, which is characteristic of approximately 30% amonia dissociation, may be found to have an injurious effect if exhausted into contact with certain turbine components. It is, accordingly, desirable that further temperature reductions be obtained, and in order to promote further dissociation of the ammonia product, there is herein provided the secondary reaction chamber designated by the numeral 12 in FIGURE 1.

An important function of the dissociation chamber 12 is the promotion of further ammonia decomposition and consequent temperature reduction of the gaseous products obtained. A feature of the chamber 12 is the provision therein of a non-catalytic path, heated by the earlier exothermic reaction and over which the ammonia gas is directed to accomplish further dissociation into nitrogen and hydrogen. The dissociation chamber 12 may, accordingly, take many forms; however, it has been found after extensive investigation that for given pressures and flow rates, the percentage of amonia dissociation and exhaust gas temperature reduction which is to be acomplished are a function of the product of the length of the path over which the gas is caused to travel and the surface area available for contact with the gas during its travel, as well as the internal volume of the chamber within which the ammonia product dissociation is promoted.

Figure 2:
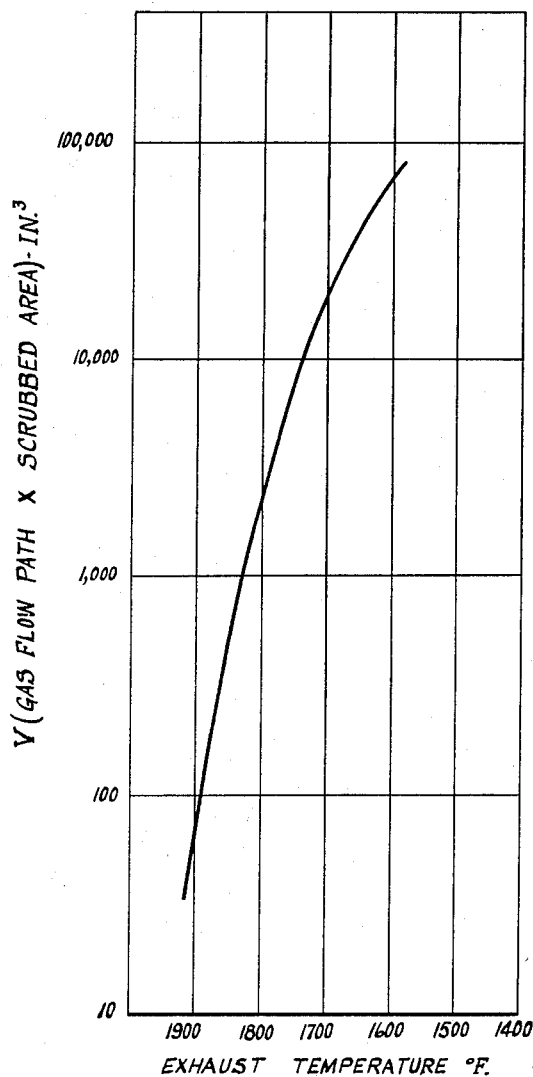
FIGURE 2 is a graph plotting exhaust gas temperature against the product of gas flow path and scrubbed area.

The relationship between exhaust gas temperatures and the product of gas flow path and scrubbed area is set forth graphically in FIGURE 2. The product of gas flow path and scrubbed area is designated by the legend "V" measured in cubic inches, and the graph rather clearly demonstrates that as the value of "V" is increased, there is a decrease in the exhaust gas temperatures which are obtained. The results shown in the graph of FIGURE 2 were obtained utilizing a dissociation chamber into which the gaseous product was directed at 500 pounds per hour at 600 pounds per square inch pressure. Variations in the flow rate and pressure would of course be expected to change slightly the curve shape.

The effect of the factor of reaction chamber internal volume upon exhaust gas temperature is shown in the graph of FIGURE 7. At a fuel flow rate of 500 pounds per hour at 600 pounds per square inch, an increase of the chamber internal volume from approximately 10 cubic inches to 50 cubic inches provides a marked reduction in exhaust gas temperatures, generally in the neighborhood of 300° F.

Knowing now the substantial effect which the product of gas flow path and scrubbed area, and the factor of chamber internal volume, have upon exhaust gas temperatures, it is possible to design a dissociation chamber which is productive of any desired amount or percentage of ammonia dissociation. Thus, knowing the fuel flow rate and pressures to be encountered, and the exhaust gas temperature which particular component materials can withstand, a thermal decomposition gas generator may be designed with an internal volume and factor of "V" which will be productive of the results desired with a degree of accuracy not considered possible with catalytic type gas generators.

Figure 4:
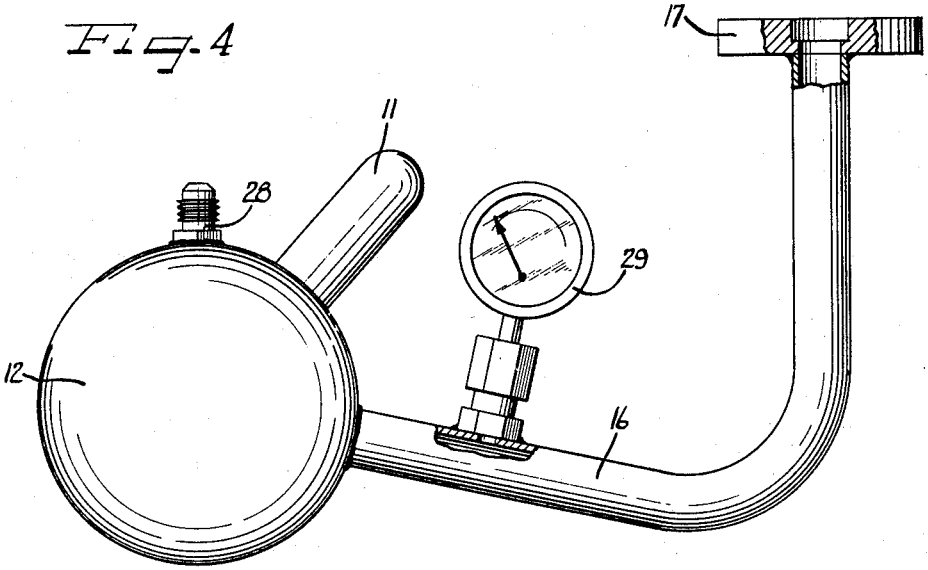
FIGURE 4 is an end view of one form of gas generator utilizing the novel features herein disclosed.

A specific form of dissociation chamber embodying the inventive concepts herein disclosed is shown in FIGURES 4 and 6 and reference is now made thereto. Where applicable, like numerals from the schematic view of FIGURE 1 have been applied. The chamber 12 comprises a substantially cylindrical enclosed housing 18 receiving at one end a connector tube 11 passing interiorly of a support tube 19, which may be welded or otherwise secured to the chamber housing 18. Attached to the connector tube 11 and extending substantially entirely throughout the length of the housing 18 is a first pass tube 20. Surrounding the first pass tube 20 and supported one by the other in spaced relation thereto by separator members 21 are a plurality of pass tubes 22–26, which may be welded or otherwise attached to the housing inner walls. In the arrangement shown seven passes are provided, and the gaseous products and thermal energy resulting from decomposition of hydrazine in the first reaction chamber 10 are received in the connector tube 11 and directed rearwardly through the pass tube 20 and into the second pass tube 22 from which the gaseous products and heat energy pass from the forward end thereof into the corresponding end of the pass tube 23. The products of the initial decomposition thus travel forwardly and rearwardly in scrubbing contact with the pass tubes 20 and 22–26 which are heated by the thermal energies of the decomposition reaction, and accordingly, are in heat exchange relation with the gaseous products to maintain the ammonia gas portion thereof well above its decomposition temperature to thereby promote the dissociation thereof into nitrogen and hydrogen with a resulting temperature reduction.

An arrangement of seven pass tubes or heat exchangers is shown in the drawings; however, this number and their particular configuration can of course be modified to obtain the results desired. The objective sought is a reduction of the exhaust gas temperature to a level non-injurious to turbine or other components, and as earlier stated, this is a function of the product of gas flow path length and scrubbed area. Accordingly, and referring now also to FIGURE 2, if a flow rate of 500 pounds per hour at a pressure of about 600 p.s.i. were to be used and a temperature reduction obtained in the gaseous products from about 1900° F. at their point of entry to the housing 18 to about 1700° F. when exhausted therefrom, the arrangement of pass tubes or heat exchangers within the housing would be designed to provide a value for "V," or the product of gas flow path and scrubbed area, of about 20,000 cubic inches. The length of the pass tubes 20 and 22–26 providing the gas flow path value, and the diameter of the said tubes as the variable factor in the scrubbed area value, could then readily be designed to accomplish the desired temperature reduction. These factors as determined for a particular temperature reduction will govern generally to a large measure the internal volume of the housing 18.

The housing 18 is further constructed to include a pressure fitting 27 and cold run fitting 28 normally disposed upon the circumference of the housing in the manner shown. The exhaust gases at reduced temperatures are received by an exhaust connection 16 arranged at the opposite or rearward end of the housing 18 in communication with the exit end of the pass tube 26. To record the temperature of the exhaust gases received from the disclosed dissociation chamber, there is located on the circumference of the exhaust tube or connection 16 a temperature indicating device 29 which may be in the form shown in FIGURE 4. At the extreme end of the exhaust tube 16 is an exhaust or hot nozzle 17 which, as earlier indicated, may take any one of a number of different forms well known to the art.

The operation of the present invention may be summarized as follows. The first reaction zone or chamber 10 is heated to the decomposition temperature of the fuel mixture to be injected therein, and the fuel mixture directed into said chamber from a pressurized fuel source through the inlet pipe 15 and injector nozzle 14 into impinging contact with the heater member 13. If the fuel mixture contains hydrazine, decomposition takes place at a temperature generally under about 700° F. into nitrogen, hydrogen and ammonia, with the release of substantial exothermic energy. The heat energies are sufficient to heat the gaseous decomposition products to about 2000° F., and at this temperature ammonia very rapidly dissociates into nitrogen and hydrogen with an absorption of heat energy. The temperature of the gaseous products at this point are generally at approximately 1900° F., and about 30% of the ammonia is dissociated. The gaseous products at the latter temperature are then passed through the connector tube 11 into the dissociation of secondary reaction chamber 12.

The chamber 12 is constructed to provide a heat exchange path of particular length and area in accordance with the value "V" earlier noted, and which is the product of gas flow path and scrubbed area. If a dissociation chamber of the construction shown in FIGURES 4 and 6 is employed, having the desired "V" and internal volume values, the gaseous products of the initial decomposition of hydrazine, as well as substantial thermal energies, pass through the pass tubes 20 and 22–26 in the manner earlier described. The gaseous products are scrubbed during their tortuous flow through the heated pass tubes or heat exchangers, and upon being discharged therefrom through the exhaust connection 16 have experienced a temperature reduction conforming to the percentage of ammonia dissociation desired. By varying the internal volume of the dissociation chamber, and the product of gas flow path and scrubbed area, temperature reductions down to at least 1500° F. under particular flow and pressure conditions are readily obtainable. And at such temperatures, likelihood of damage or harmful effects upon the turbine or other components is substantially remote.

It may be seen from the foregoing that the gas generator and decomposition method of this invention effectively avoid the objections and disadvantages of the heretofore known catalytic decomposition chambers. The temperature of the exhaust gases received from the gas generator of this invention can readily be predicted in advance since it is fabricated of structure not likely to deteriorate over periods of use. Non-uniformity of results long associated with variable catalyzer packing densities are thus effectively avoided. Further, under conditions of vibration and pressure differentials, the structure of this invention remains stable and the possibility is remote that any elements of the gas generator will be loosened during usage and ultimately be exhausted into the turbine or other component structures. The device of this invention additionally may be readily fabricated, and possesses weight and space requirements substantially less than the customarily employed catalytic type gas generator.

It is to be understood that the forms of the invention herein shown and described are to be taken as preferred embodiments of the same, and that various changes in the size, shape and arrangement of parts may be effected without departing from the spirit of the invention or the scope of the subjoined claims. As for example, rather than utilize a pair of chambers 10 and 12 connected by conduit 11, a partitioned single chamber may be found more efficient from the standpoint of heat conductance.

I claim as my invention:

1. A gas generator for high energy fuels, comprising a first reaction zone, heating means in said zone, a fuel injector located in the reaction zone and directing a fuel mixture into impinging contact with the heating means to initiate decomposition of the fuel mixture into a plurality of gaseous products, one of which is susceptible to further dissociation and heat absorption upon exposure to exothermic heat energies released by the initial decomposition, a second reaction zone in communication with the first zone and heated thereby receiving the gaseous products to further dissociate said one gaseous product and reduce the temperature of the gaseous products resulting, and exhaust means in communication with the second zone and porting the resulting reduced temperature gaseous products and any volumes of said one gaseous product remaining therewith.

2. A gas generator for high energy fuels, comprising a first reaction zone, heating means in said zone, a fuel injector located in the reaction zone and directing a fuel mixture into impinging contact with the heating means to initiate decomposition of the fuel mixture into a plurality of gaseous products, one of which is susceptible to further dissociation and heat absorption upon exposure to exothermic heat energies released by the initial decomposition, a second reaction zone in communication with the first zone, heat exchange means in the second zone receiving the gaseous products from the first zone to promote the dissociation of said products and reduce the temperature of the gaseous products resulting, and exhaust means in communication with the second zone and porting the resulting reduced temperature gaseous products and any volumes of said one gaseous product remaining therewith.

3. A gas generator for high energy fuels, comprising a pair of substantially enclosed reaction chambers, tubular means connecting said chambers, heating means in the first chamber, injector means also in said chamber directing a fuel mixture into impinging contact with the heating means to raise the temperature of said mixture and initiate the decomposition thereof into a plurality of gaseous products and release exothermic energies, one of the gaseous products being susceptible to further dissociation and heat absorption upon exposure to exothermic heat energies released by the initial decomposition, heat exchange means in the second reaction chamber receiving the gaseous products and exothermic energies from the first chamber through the tubular connecting means and dissociating said one gaseous product and reducing the temperature of the gaseous products resulting, and an exhaust outlet in the second chamber receiving the resulting reduced temperature gaseous products and any volumes of said one gaseous product remaining therewith from the heat exchange means.

4. A gas generator for high energy fuels, comprising a pair of substantially enclosed reaction chambers, tubular means connecting said reaction chambers, heating means in the first chamber, injector means also in said chamber directing a fuel mixture into impinging contact with the heating means to raise the temperature of said mixture and initiate the decomposition thereof into a plurality of gaseous products and release exothermic energies, one of the gaseous products being susceptible to further dissociation and heat absorption upon exposure to exothermic heat energies released by the initial decomposition, heat exchange means in the second reaction chamber receiving the gaseous products and exothermic energies from the first chamber through the tubular connecting means and directing said products along a continuous heated path to maintain said one gaseous product above its decomposition temperature to dissociate the same and reduce the temperature of the gaseous products resulting, and an exhaust outlet in the second chamber receiving the resulting reduced temperature gaseous products and any volumes of said one gaseous product remaining therewith from the heat exchange means.

5. A gas generator for high energy fuels, comprising a pair of substantially enclosed reaction chambers, tubular means connecting said reaction chambers, heating means in the first chamber, injector means also in said chamber directing a fuel mixture into impinging contact with the heating means to raise the temperature of said mixture and initiate the decomposition thereof into a plurality of gaseous products and release exothermic energies, one of the gaseous products being susceptible to further dissociation and heat absorption upon exposure to exothermic heat energies released by the initial decomposition, heat exchange means in the second reaction chamber receiving the gaseous products and exothermic energies from the first chamber through the tubular connecting means and further dissociating said one gaseous product and reducing the temperature of the gaseous products resulting, said heat exchange means having a gas path length and scrubbed surface area the product of which is a value determinative of the extent of temperature reduction of the resulting gaseous products, and an exhaust outlet in the second chamber receiving the resulting reduced temperature gaseous products and any volumes of said one gaseous product remaining therewith from the heat exchange means.

6. A hydrazine gas generator, comprising means defining first and second connected reaction zones, means for injecting hydrazine into the first zone, means for heating the first zone to a temperature sufficient to decompose the hydrazine into ammonia, hydrogen and nitrogen, heat exchange means in the second zone heated by the hot gases from the first zone to heat the second zone to a temperature sufficient to dissociate the ammonia into nitrogen and hydrogen and to be cooled by said dissociation of the ammonia to accommodate discharge of gases from the second zone at a lower temperature than the gases entering said zone, and an outlet for the cooled gases.

7. A gas generator for high energy monopropellant fuels comprising means defining first and second connected reaction zones, means for injecting a monopropellant fuel into said first zone, means for maintaining said first zone at a temperature sufficient to decompose the fuel into a plurality of gaseous products including a product susceptible to further dissociation and heat absorption upon exposure to heat, heat exchange means in said second zone heated by hot gases from the first zone to heat the second zone to a temperature sufficient to effect said further dissociation of said product and to be cooled by said dissociation for accommodating discharge of gases from the second zone at a lower temperature than the gases entering said second zone, and a second zone outlet for the cooled gases.

References Cited in the file of this patent

UNITED STATES PATENTS

| | | |
|---|---|---|
| 1,092,903 | Ellis | Apr. 14, 1914 |
| 1,363,488 | Uhlinger | Dec. 28, 1920 |
| 1,987,092 | Winkler | Jan. 8, 1935 |
| 2,648,317 | Mikulasek | Aug. 11, 1953 |
| 2,751,750 | Welch | June 26, 1956 |
| 2,775,866 | Randall | Jan. 1, 1957 |
| 2,832,402 | Jurisich | Apr. 29, 1958 |

FOREIGN PATENTS

| | | |
|---|---|---|
| 154,254 | Great Britain | Nov. 22, 1920 |